(12) United States Patent
Hall

(10) Patent No.: US 12,238,388 B2
(45) Date of Patent: *Feb. 25, 2025

(54) SYSTEMS AND METHODS FOR GRAPHICAL DATA PRESENTATION DURING A SPORTING EVENT BROADCAST

(71) Applicant: SportsMEDIA Technology Corporation, Durham, NC (US)

(72) Inventor: Gerard J. Hall, Durham, NC (US)

(73) Assignee: SportsMEDIA Technology Corporation, Durham, NC (US)

(*) Notice: Subject to any disclaimer, the term of this patent is extended or adjusted under 35 U.S.C. 154(b) by 0 days.

This patent is subject to a terminal disclaimer.

(21) Appl. No.: 18/618,552

(22) Filed: Mar. 27, 2024

(65) Prior Publication Data

US 2024/0244301 A1    Jul. 18, 2024

Related U.S. Application Data

(63) Continuation of application No. 18/077,773, filed on Dec. 8, 2022, now Pat. No. 12,010,398, which is a continuation of application No. 17/198,952, filed on Mar. 11, 2021, now Pat. No. 11,528,537, which is a continuation of application No. 16/682,626, filed on Nov. 13, 2019, now Pat. No. 10,951,957, which is a continuation of application No. 16/271,240, filed on Feb. 8, 2019, now Pat. No. 10,484,757, which is a continuation of application No. 15/915,771, filed on Mar. 8, 2018, now Pat. No. 10,206,013.

(60) Provisional application No. 62/469,220, filed on Mar. 9, 2017.

(51) Int. Cl.
*H04N 21/81* (2011.01)
*G06T 11/20* (2006.01)
*H04N 21/431* (2011.01)
*H04N 21/488* (2011.01)

(52) U.S. Cl.
CPC ....... *H04N 21/8126* (2013.01); *G06T 11/206* (2013.01); *H04N 21/4312* (2013.01); *H04N 21/4882* (2013.01)

(58) Field of Classification Search
None
See application file for complete search history.

(56) References Cited

U.S. PATENT DOCUMENTS

| | | |
|---|---|---|
| 7,646,914 B2 | 1/2010 | Clausi et al. |
| 8,401,460 B2 | 3/2013 | Ortiz et al. |
| 8,610,786 B2 | 12/2013 | Ortiz |
| 8,944,928 B2 | 2/2015 | Kaps et al. |

(Continued)

*Primary Examiner* — Omar S Parra
(74) *Attorney, Agent, or Firm* — NEO IP

(57) ABSTRACT

Systems and methods for graphical data presentation during a sporting event broadcast are disclosed. A server platform is constructed and configured in network communication with at least one input device and at least one display device. The at least one input device transmits input data with time code related to the sporting event to the server platform in real time or near real time. The server platform processes the input data according to a production sequencing of the sporting event, thereby creating processed data. The server platform creates and integrates the processed data with a video presentation of the sporting event based on the production sequencing of the sporting event. The at least one display device displays a customized graphical presentation of the processed data with the video presentation.

20 Claims, 7 Drawing Sheets

(56) References Cited

U.S. PATENT DOCUMENTS

| | | |
|---|---|---|
| 9,002,979 B2 | 4/2015 | Hansen |
| 9,039,527 B2 | 5/2015 | Bentley et al. |
| 2015/0074560 A1 | 3/2015 | Conley et al. |
| 2015/0131845 A1 | 5/2015 | Forouhar et al. |
| 2015/0149837 A1 | 5/2015 | Alonso et al. |
| 2015/0248194 A1 | 9/2015 | Simpson |
| 2018/0054659 A1 | 2/2018 | Goswami |
| 2018/0189971 A1 | 7/2018 | Hildreth |
| 2018/0262817 A1 | 9/2018 | Hall |
| 2019/0215576 A1 | 7/2019 | Hall |
| 2020/0084517 A1 | 3/2020 | Hall |
| 2021/0204038 A1 | 7/2021 | Hall |
| 2022/0335720 A1 | 10/2022 | Chang et al. |
| 2023/0119922 A1 | 4/2023 | Hall |

Sample of relevant NGS Stats

- All SMT NGS statistics are available for full game, as well as within multiple game contexts – by Down, by Red Zone, by Quarter, by Half, etc.

| Quarterback | Running Back | Receiver |
|---|---|---|
| Average Snap to Pass Time | Stats when Running in L, Center and R Gap | Stats when Lining Up Slot, Wide, L/R |
| Average Dropback Distance | Stats Against Defensive Personnel Package | Stats Against Defensive Personnel Package |
| Average Pocket Radius at Release | Net Yards Before Contact | Stats by Route Type (Corner, Flat, etc.) |
| Stats Per Skill Player Combination | Net Yards After Contact | Average Coverage Radius (when Targeted) |
| Stats when Targeted Receiver Tightly Covered | Number of Plays | Number of Plays |
| Stats when Targeted Receiver Runs Route Type | Target Percentage (% Run/Pass Target) | Target Percentage (% Run/Pass Target) |
| Stats when Targeted Receiver Lines Up L/R | Gross Yards Run | Percentage Open on Pass Play |
| Stats on Short, Mid and Long Targets | Net Yards Run (North/South) | Yards After Contact |
| # Pressures (Low Pocket Radius at Release) | Running Efficiency (Net/Gross) | Yards Run |
| Average and Max Speed | Average and Max Speed | Average and Max Speed |

FIG. 2

SYSTEMS AND METHODS FOR GRAPHICAL DATA PRESENTATION DURING A SPORTING EVENT BROADCAST

CROSS-REFERENCES TO RELATED APPLICATIONS

The present invention is related to and claims priority from the following U.S. patent documents. This application is a continuation of U.S. patent application Ser. No. 18/077,773, filed Dec. 8, 2022, which is a continuation of U.S. patent application Ser. No. 17/198,952, filed Mar. 11, 2021 and issued as U.S. Pat. No. 11,528,537, which is a continuation of U.S. patent application Ser. No. 16/682,626, filed Nov. 13, 2019 and issued as U.S. Pat. No. 10,951,957, which is a continuation of U.S. patent application Ser. No. 16/271,240, filed Feb. 8, 2019 and issued as U.S. Pat. No. 10,484,757, which is a continuation of U.S. patent application Ser. No. 15/915,771, filed Mar. 8, 2018 and issued as U.S. Pat. No. 10,206,013, which claims priority from U.S. Provisional Patent Application No. 62/469,220, filed Mar. 9, 2017, each of which is incorporated herein by reference in its entirety.

BACKGROUND OF THE INVENTION

1. Field of the Invention

The present invention is directed to organizing, developing, and refining graphical data presentations during the broadcast of a sporting event.

2. Description of the Prior Art

Sports broadcasting is evolving with the development of modern technology, such as sensing, tracking, computational, and communication technologies. More and more sports data become available to different parties involved in a sporting event, including coaches, managers, medical staff, players, broadcasters, fans, and viewers. Those data only make sense to these different parties when digestible information can be extracted and presented to them in certain formats. For sports broadcasting, it is a challenge to integrate sports data and statistics into video presentation in a timely manner during a production.

Exemplary US Patent Documents relevant to the prior art include:

U.S. Pat. No. 7,646,914 for "System and method for collecting and analyzing event data" by David Anthony Clausi et al. filed Jun. 15, 2006, describes a computer-based system for the gathering and analysis of data and planning associated with that data captured during or related to events. The system is based on existing core technology that allows for the use of a digital pen land marked with respect to some spatial location on the surface of a computer screen that allows storage of ink data and allows for interpretation of handwritten characters. A mouse can be used in place of the digital pen, however, it is advantageous to use the digital pen on the surface of a computer screen. Part of the invention is able to capture real-time data in dynamic environments where the user must maintain active contact with the scene, allowing only minimal viewing of the computer screen. This minimal viewing component can be applied to, but not limited to, polling, traffic analysis, and sporting events. For the application to team sporting events, the minimal viewing component provides an efficient means for personnel to enter game statistics in real-time. The complete system also provides a means of, but is not limited to, generating team and player statistics across a selection of seasons, games or groups of games; capturing both spatial and temporal events; synchronizing digital video with event actions; analyzing contributions of groups of players based on game statistics; maintaining detailed scouting information on a plurality of teams; maintaining detailed scouting and recruiting information on a plurality of individual personnel; channeling a plurality of selected subsets of data; storing a plurality of game plays (formatted and unformatted); preparing and displaying data associated with a league containing multiple teams; and enabling strategic decisions (drills, practices, schedules, goal setting).

U.S. Pat. No. 8,401,460 for "Transmitting sports and entertainment data to wireless hand held devices over a telecommunications network" by Luis M. Ortiz et al. filed Nov. 30, 2011, describes a method and system for wirelessly providing venue-based data to one or more wireless hand held devices. Venue-based data can be acquired from one or more venues. The venue-based data can be authenticated and wirelessly transmitted to one or more hand held devices through one or more wireless telecommunications networks, in response to authenticating the venue-based data and/or the hand held device(s) and/or a user of the hand held device(s), in order to permit the venue-based data to be accessible via one or more hand held devices at locations remote from the venue(s).

U.S. Pat. No. 9,002,979 for "Sports timing system (STS) event and participant announcement communication system (EPACS) and method" by Kurt S. Hansen filed Jan. 11, 2011, describes systems and methods for communicating real-time sporting event and participant announcement information received from a sport timing system (STS). The system comprising an announcement interface system having a processor, a memory, a first data interface communicating over a stateless packet data communication network with the sport timing system, and a second interface communicating with an announcement system. The first data interface receives a multicast datagram ANNC message including an identification of the sport timing system and participant data including a participant identifier for uniquely identifying each participant in the sporting event and participant timing data. The announcement interface system formats the received portion of the participant data into an announcement system message and transmitting the announcement system message including the participant data, the participant identifier and participant timing data.

U.S. Pat. No. 9,039,527 for "Broadcasting method for broadcasting images with augmented motion data" by Michael Bentley filed Sep. 8, 2014, describes a broadcasting method for broadcasting images with augmented motion data, which may utilize a system having at least one camera, a computer and a wireless communication interface. The system obtains data from motion capture elements, analyzes data and optionally stores data in database for use in broadcasting applications, virtual reality applications and/or data mining. The system also recognizes at least one motion capture data element associated with a user or piece of equipment, and receives data associated with the motion capture element via the wireless communication interface. The system also enables unique displays associated with the user, such as 3D overlays onto images of the user to visually depict the captured motion data. Ratings, compliance, ball flight path data can be calculated and displayed, for example on a map or timeline or both. Furthermore, the system enables performance related equipment fitting and purchase.

US Patent Publication No. 20150074560 for "System and Method for Enhanced Second Screen Experience" by Michael P. Conley et al. filed Mar. 29, 2013, describes a system and method for providing an enhanced second screen experience including a content-rich second screen user interface with information relative to an event and event participants as well as social media aspects relative to the event and event participants.

U.S. Pat. No. 8,610,786 for "Providing multiple video perspectives of activities through a data network to a remote multimedia server for selective display by remote viewing audiences" by Luis M. Ortiz filed Feb. 2, 2012, describes Multiple visual perspectives in video of private and public activities including those in public areas such as entertainment venues captured by cameras located near the activities can be transmitted over data networks to a server where video-related data is processed and recorded for selective display by authorized, remote video display devices (e.g., HDTV, set-top boxes, computers, handheld devices) in wired/wireless communication with the server. Users can be registered and authorized to access the server to provide/access video captured by cameras at activities. Wireless handheld devices can selectively retrieve video-related data captured at activities for server storage and subsequent display by video display devices. Captured video/pictures can be organized in a server based on at least one of: activity title, activity time, activity date, activity place, wireless handheld device location at time of video recording, distance from location of interest. Simultaneous display of multiple videos on a display can be synchronized.

U.S. Pat. No. 8,944,928 for "Virtual reality system for viewing current and previously stored or calculated motion data" by Ryan Kaps et al. filed Nov. 16, 2012, describes a virtual reality system for viewing current and previously stored or calculated motion data. System obtains data from motion capture elements, analyzes data and stores data in database for use in virtual reality applications and/or data mining, which may be charged for. Enables unique displays associated with the user, such as 3D overlays onto images of the user to visually depict the captured motion data. Ratings, compliance, ball flight path data can be calculated and displayed, for example on a map or timeline or both. Enables performance related equipment fitting and purchase. Includes active and passive identifier capabilities.

US Patent Publication No. 20150149837 for "Method, Apparatus, and Computer Program Product for Collecting and Displaying Sporting Event Data Based on Real Time Data for Proximity and Movement of Objects" by Rodrigo Alonso et al. filed Oct. 24, 2014, describes a method, apparatus and computer program product for collecting sporting event data based on real time data for proximity and movement of objects. In the context of a method, the method includes calculating a tag data filter parameter for a plurality of tag events based on received tag blink data and tag location data, wherein the tag data filter parameter comprises a blink period, distance span, or velocity, calculating a participant location data adjustment factor based on the tag data filter parameter, and calculating multidimensional player location information per unit time based on the plurality of tag events and the participant location adjustment factor.

US Patent Publication No. 20150248194 for "Real-Time Collection and Distribution of Information for an Event Organized According to Sub-events" by Keith Simpson filed Feb. 28, 2014, describes a system and method of asynchronously collecting different types of information for an event (e.g., football game) and aggregating the information in real-time according to sub-events (e.g., plays from scrimmage). One or more terminals (e.g., smartphones, tablet or laptop computers) are configured to capture information (video, still images, metadata) of each sub-event and distribute the captured information to the other terminals in real-time. Such distribution may be facilitated using a cloud network and server, or else a peer-to-peer (P2P) network. Further, one of the terminals is configured to notify the other terminals when a particular sub-event has commenced, thus allowing the captured information of the particular sub-event to be associated with a corresponding sub-event identifier. The captured information may be aggregated according to the sub-events by use of sub-event identifiers for presentation to users, e.g., in a playlist.

US Patent Publication No. 20150358680 for "System, Method and Interface for Presenting Event Coverage Using Plural Concurrent Interface Portions" by David Feldstein et al. filed Jun. 8, 2015, describes a system, method and interface for presenting event coverage using plural concurrent interface portions is provided including concurrent interface portions, each interface portion including different classes of event information.

SUMMARY OF THE INVENTION

The present invention is directed to systems and methods for graphical data presentation during a sporting event broadcast. Raw data and associated time codes are collected from various sources, and processed based on a sequencing of a sporting event. A framework is designed based on the types of available data, the timing of the available data, the context of a sporting event, and the type of display devices. The processed data is integrated with video presentation according to the designed framework based on production sequencing of the sports event broadcast.

These and other aspects of the present invention will become apparent to those skilled in the art after a reading of the following description of the preferred embodiment when considered with the drawings, as they support the claimed invention.

BRIEF DESCRIPTION OF THE DRAWINGS

FIG. 2 is a sample of relevant Next Gen Stats (NGS) data.

DETAILED DESCRIPTION

The present invention is related to organizing, developing, and refining graphical presentations of next generation statistical data according to production sequencing during a sporting event broadcast.

In recent years, with the development of tracking and sensing technology, more and more data can be collected from players during a sports event than ever before. In some embodiments, tracking chips are embedded in or attached to uniforms, padding, helmets, gloves, wrist bands, head bands, shoes, protective wear, or other wearable items for sports players, such as by way of example and not limitation, basketball players, football players, soccer players, baseball players, hockey players, lacrosse players, for tracking their locations and directions. In some embodiments, at least one sensor, chip or transmitter is embedded under or attached to the skin of the sports players, or removably attached to the sports players, for example as in a removable adhesive patch or tape. In some embodiments, various biometric sensors are also embedded in different wearable devices removably attachable on players to obtain various biometric data for players. Biometric data includes, by way of example and not limitation, heart rates, lung capabilities, core body temperatures, hydration, respiration, impact metrics, etc. For example, a mouth guard used by a football player has a temperature sensor for sensing the football player's body temperature, a hydration sensor for sensing the hydration level, and an impact sensor for sensing impacts on the player's head. There are so many types of data available during a sports event that this data has not been integrated in sports broadcasting and presentation in an effective way. For example, the NFL and its broadcast partners have been struggling for the past three years trying to figure out the best way to use the XYZ player tracking data to enhance the presentation of a football game. It has not been a success to date.

In one embodiment of the present invention, an efficient and effective method is provided for organizing, developing, and refining graphical presentations of data during a sporting event broadcasting based on: types of available data; timing of data availability; a general "rhythm", event sequencing, and natural cadence of the sporting event; the context of the sporting event; and types of display devices.

Figure 1:
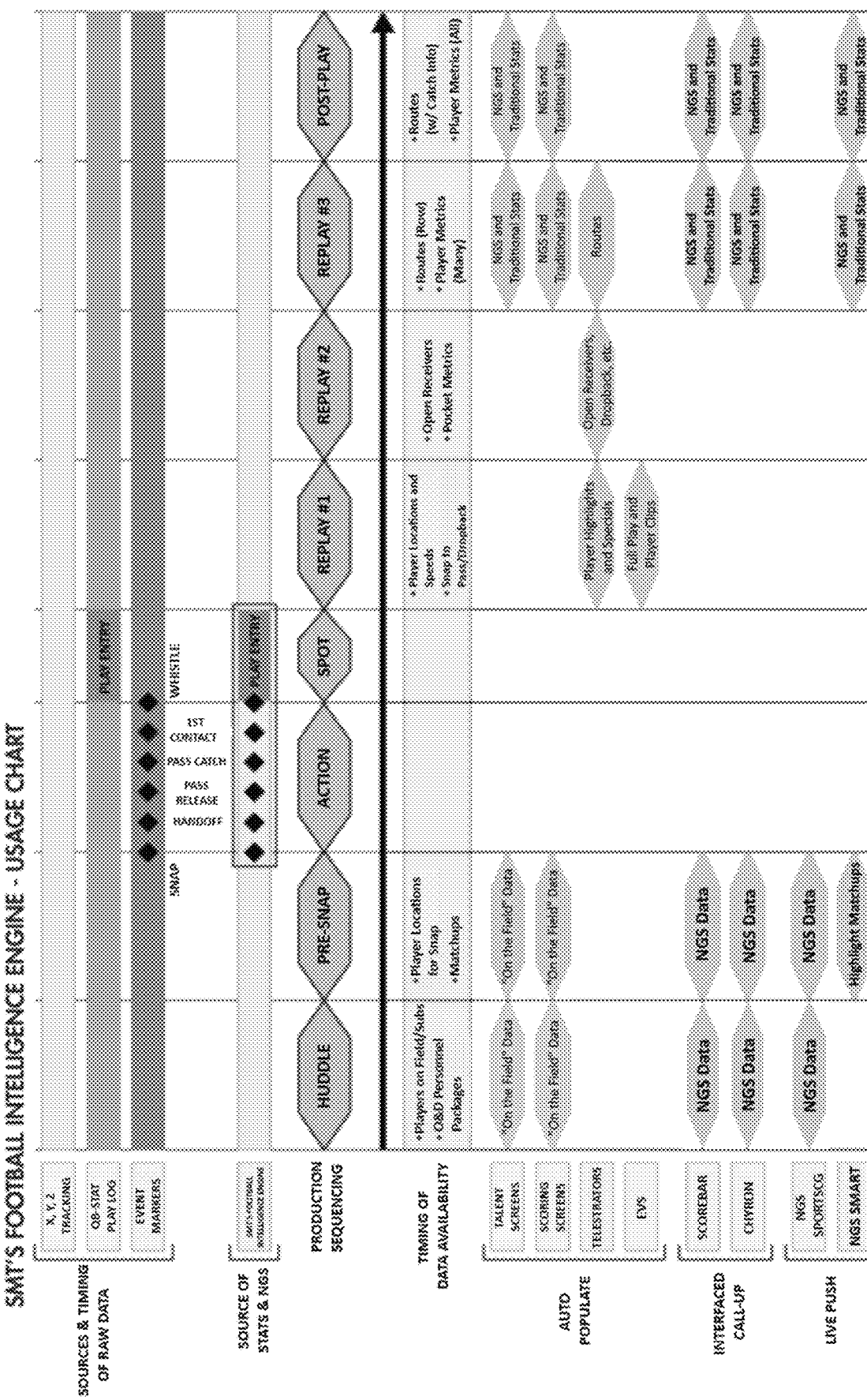
FIG. 1 is an exemplary data usage chart in a single football play.

In one embodiment of the present invention, a framework is provided for streamlining next generation stats data along with production sequencing during a sporting event so that appropriate data are displayed at appropriate times in appropriate graphics. Such a framework is defined in a rules engine based on the types of available data, the timing of the available data, the context of a sporting event, and the types of display devices. In one embodiment, the framework is a usage chart as shown in FIG. 1 as an example. An intelligent analytics platform is operable to receive data from different data sources, and process the data based on the sequencing of a sporting event. In one embodiment, the intelligent analytics platform comprises at least one rules engine defining at least one framework for data processing for at least one sporting event. In another embodiment, there is one rules engine corresponding to one type of sporting event. The intelligent analytics platform automatically aggregates, correlates and synchronizes multiple on-site data feeds. Each of the multiple on-site data feeds has a corresponding time code. The intelligent analytics platform is vendor agnostic and sensor agnostic; that is to say, the intelligent analytics platform complements any sensor product from any vendor for data collection. The intelligent analytics platform provides customizable data integration production and broadcast for a variety of sporting events. In one embodiment, the intelligent analytics platform is cloud-based.

A display device is operable to receive and display the processed data based on the sequencing of a sporting event from the intelligent analytics platform. In one embodiment, there is more than one type of display device for one sporting event. The intelligent analytics platform provides customized graphical presentations and/or customized graphical user interfaces (GUIs) on different types of display devices for displaying and/or interacting with the processed data based on the sequencing of one sporting event. For example, graphical presentations of the processed data related to the sporting event are customized when the sporting event is broadcast on television, computers, smart phones, tablets and other display devices. Graphical presentations of the processed data related to the sporting event are also customized when the sporting event is streamed on talent screens, scoring screens, telestrators, and EVS broadcasting equipment. In another example, GUIs for interacting with the graphical presentations of the processed data related to the sporting event are customized for different broadcasting and streaming devices. In one embodiment, the intelligent analytics platform provides customized GUIs and graphical presentations for devices used by different parties relating to a sporting event. For example, the graphical presentations of the processed data related to a sporting event and/or the GUIs for interacting with the graphical presentations are customized for owners, coaches, trainers, medical staff, announcers, in-stadium displays, fans, viewers, and other related parties. In another embodiment, the intelligent analytics platform provides customized graphical presentations and GUIs for different sporting events. For example, the graphical presentations and the GUIs for football, basketball, baseball, and other types of sporting events are different and customized to be suitable for each specific type of sporting event.

In one embodiment of the present invention, a usage chart methodology is applied for laying out a graphical presentation of a sporting event with appropriate data at appropriate times. FIG. 1 is an example of a usage chart used in a single football play. There are different sources of raw data, for example, XYZ tracking, quarterback stats, play log, and event markers during a single play. The event markers during a single play comprise snap, hand off, pass release, pass catch, first contact, and whistle. All these data are time-coded. For a single play, the production sequencing comprises huddle, pre-snap, action, spot, replay #1, replay #2, replay #3, and post-play. Note that the action comprises events such as snap, hand off, pass release, pass catch, first contact, and whistle. In one embodiment, the number of replay sessions during a production sequencing is not fixed. FIG. 1 is an exemplary chart showing three replay sessions for a single play. In one embodiment, the time interval for each session in the production sequencing is not fixed either. The time interval depends on the rhythm of a specific sporting event and/or specific production requirements for broadcasting.

Continuing with FIG. 1, different data are available at different times. For example, information about players on the field and substitutes, and information about Origin & Destination (O&D) Personnel Packages are available at the huddle session. Data for player locations for snap and matchups are available at a pre-snap session. Data about player locations and speeds, and data about snap to pass and dropback are available at the replay #1 session. Data about open receivers and pocket metrics are available during the replay #2 session. Data about routes and more play metrics are available during the replay #3 session. Data about routes with catch information and all player metrics are available during the post-play session.

With such a timeline as above, appropriate data are auto-populated to different display devices. For example, on a scoring screen, "on the field" data are displayed during the huddle session and the pre-snap session, and next generation statistics and traditional stats are displayed in the replay #3 session and the post-play session. Also for example, on a telestrator, player highlights and speeds are displayed in the replay #1 session, data about open receivers, dropback, etc. are displayed in the replay #2 session, and data about routes are displayed in the replay #3 session. Meanwhile, certain data can be interfaced with score bars and chyrons during a certain session. Also, appropriate data can be live pushed onto character generators (e.g., SPORTSCG from Sports-MEDIA Technology Corporation (SMT)) and virtual graphics (e.g., SMART from SMT).

With such a framework, sports data are displayed based on the production sequencing so that the viewers, the audience and other related parties have better viewing experience with informed data at appropriate times.

Figure 3:
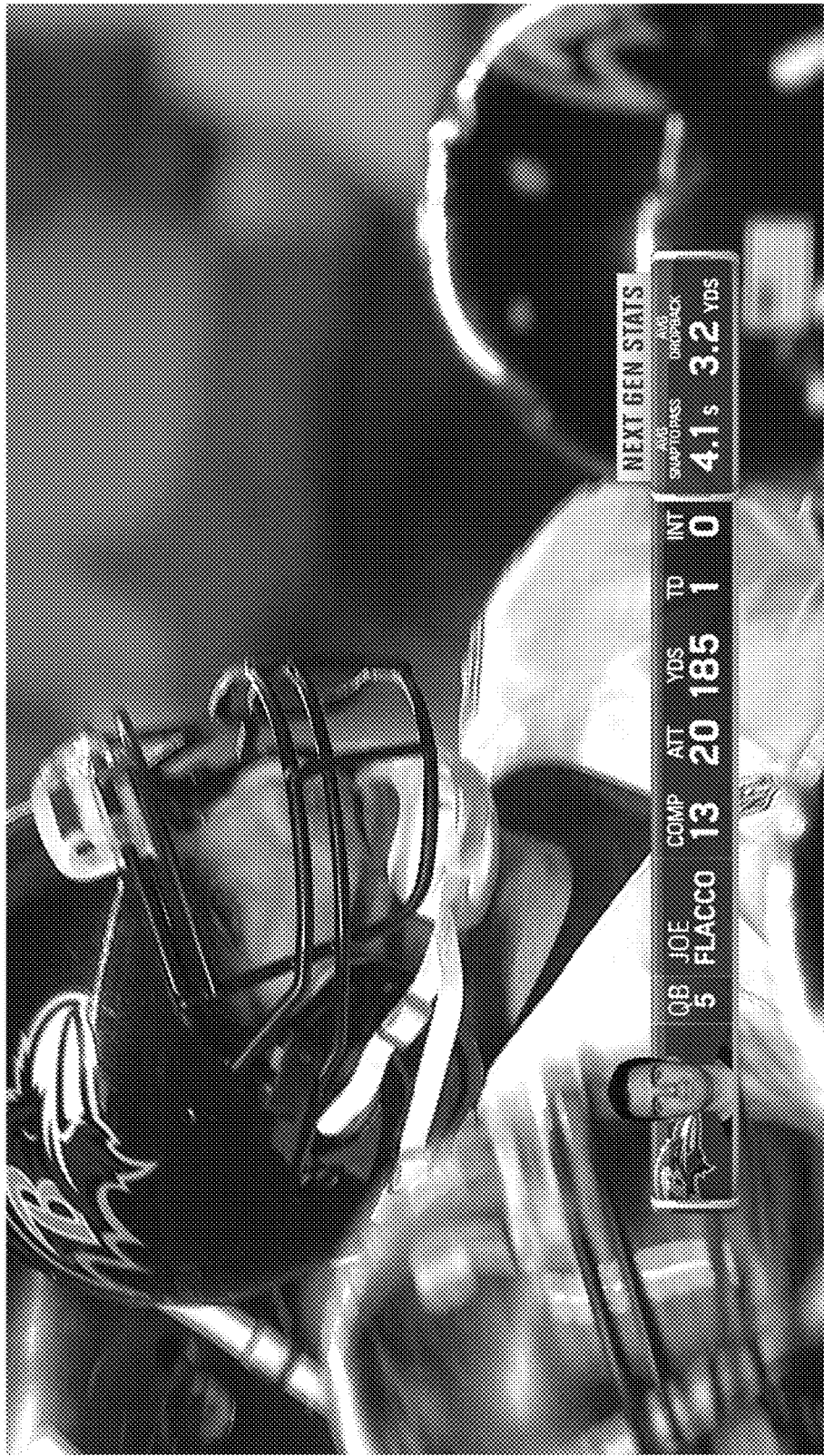
FIG. 3 illustrates an in-game hybrid stat line for a quarterback during a football game.

FIG. 2 shows a sample of relevant NGS data. NFL player tracking, also known as Next Gen Stats (NGS), is the capture of real-time location data, speed, and acceleration for every player for every play on every inch of the field. Sensors throughout the stadium track tags placed on players' shoulder pads, charting individual movements within inches. In one embodiment, NGS data are available for full games as well as within multiple game contexts, for example by Down, by Red Zone, by Quarter, by Half, etc. NGS data are also available for different players in a game. For example, in a football game, NGS data available for a quarterback comprise average snap to pass time, average dropback distance, average pocket radius at release, stats per skill player combination, stats when a targeted receiver is tightly covered, stats when a targeted receiver lines up on the left and when a targeted receiver lines up on the right, stats on short, mid and long targets, number of pressures (low pocket radius at release), and average and maximum speed. FIG. 3 illustrates an in-game hybrid stat line for a quarterback during a football game. The in-game hybrid stat line for the quarterback comprises a section for NGS data, which displays the average snap to pass time and average dropback distance of the quarterback.

Figure 4:
FIG. 4 illustrates an in-game hybrid stat line for a running back during a football game.

Continuing with FIG. 2, NGS data available for a running back comprise stats when running in the left gap, center gap and right gap, stats against defensive personnel package, net yards before contact, net yards after contact, number of plays, target percentage, gross yards run, net yards run, net and gross running efficiency, and average and maximum speed. FIG. 4 illustrates an in-game hybrid stat line for a running back in a football game. The in-game hybrid stat line for the running back comprises a section for NGS data, which displays the number of plays, the target percentage, and the running efficiency of the running back.

Figure 5:
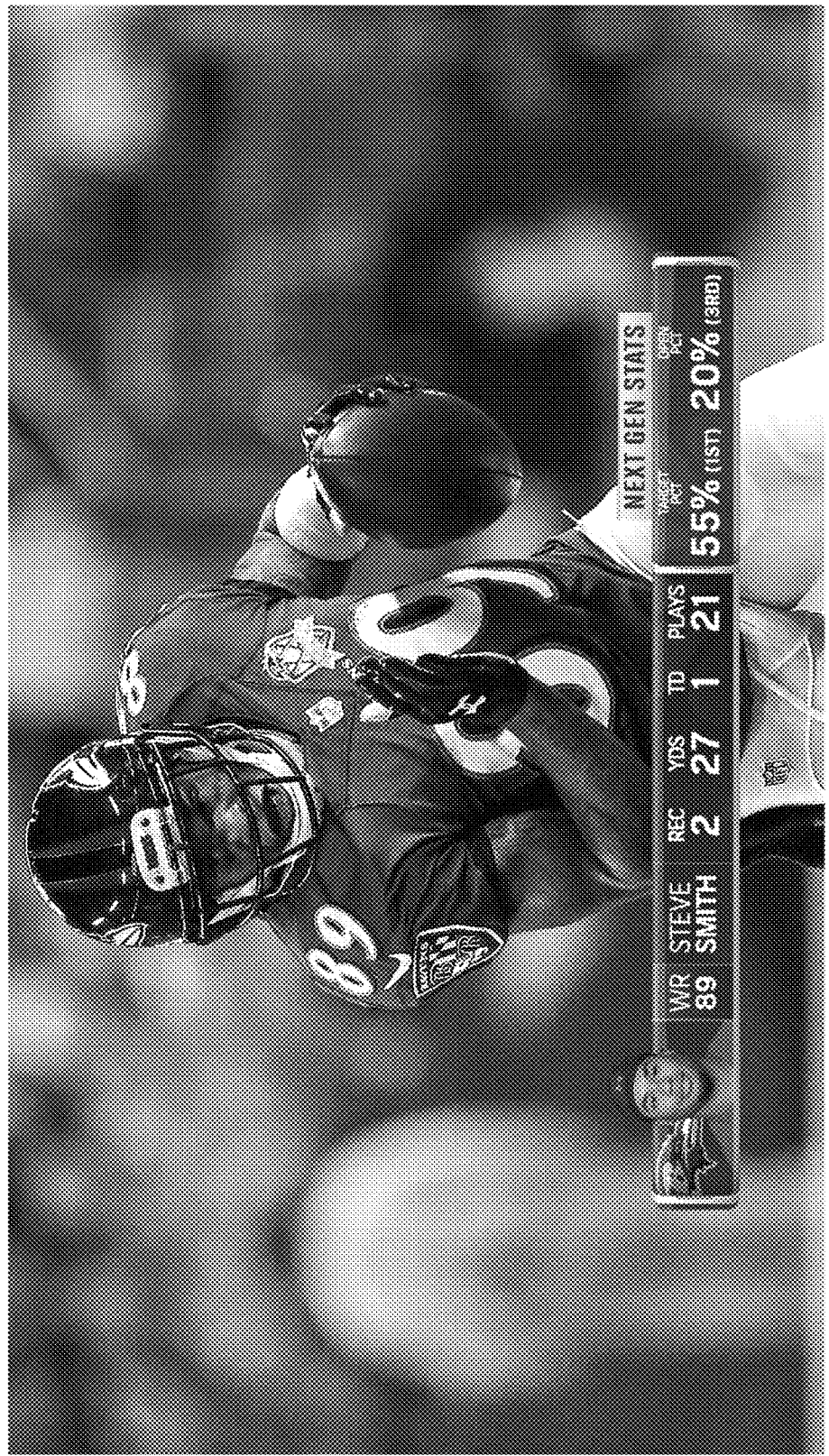
FIG. 5 illustrates an in-game hybrid stat line for a receiver during a football game.

Continuing with FIG. 2, NGS stats available for a receiver comprise stats when lining up in the slot, lining up wide, and lining up on the left and right, stats against defensive personnel package, stats by route type, average coverage radius, number of plays, target percentage, percentage open on pass play, yards after contact, yards run, and average and max speed. FIG. 5 illustrates an in-game hybrid stat line for a receiver. The in-game hybrid stat line for the receiver comprises a section for NGS data, which displays the target percentage, and the percentage open on pass play of the receiver.

In one embodiment of the present invention, the intelligent analytics platform comprises a machine learning engine to analyze different sporting events automatically. The intelligent analytics platform comprises at least one rules engine. In one embodiment, the intelligent analytics platform comprises one rules engine storing different sets of rules for different sporting events. In one embodiment, the intelligent analytics platform comprises more than one rules engines storing rules for more than one sporting events. A framework is designed based on specific rules for a specific sporting event in a rules engine. The rules engine is operable to recognize the sporting event and select a set of rules for the sporting event. In one embodiment, the at least one rules engine is operable to update rules for a sporting event.

In another embodiment, systems and methods are provided for automated sports broadcasting production. Various raw data for a sporting event are received at the analytics platform for processing, advanced data are created based on the various raw data, a framework is designed or selected for the sporting event based on usage chart methodology, and appropriate advanced data are displayed with video streaming based on a production sequencing.

In one embodiment, the analytics platform in the present invention is a cloud-based platform in networked communication with various input devices and output devices.

Although 'cloud computing' can generically be applied to any software as a service or to services interfacing through the Internet, in the present invention, 'cloud-based' computing refers to distributed computing among at least one server or more than one server.

Figure 6:
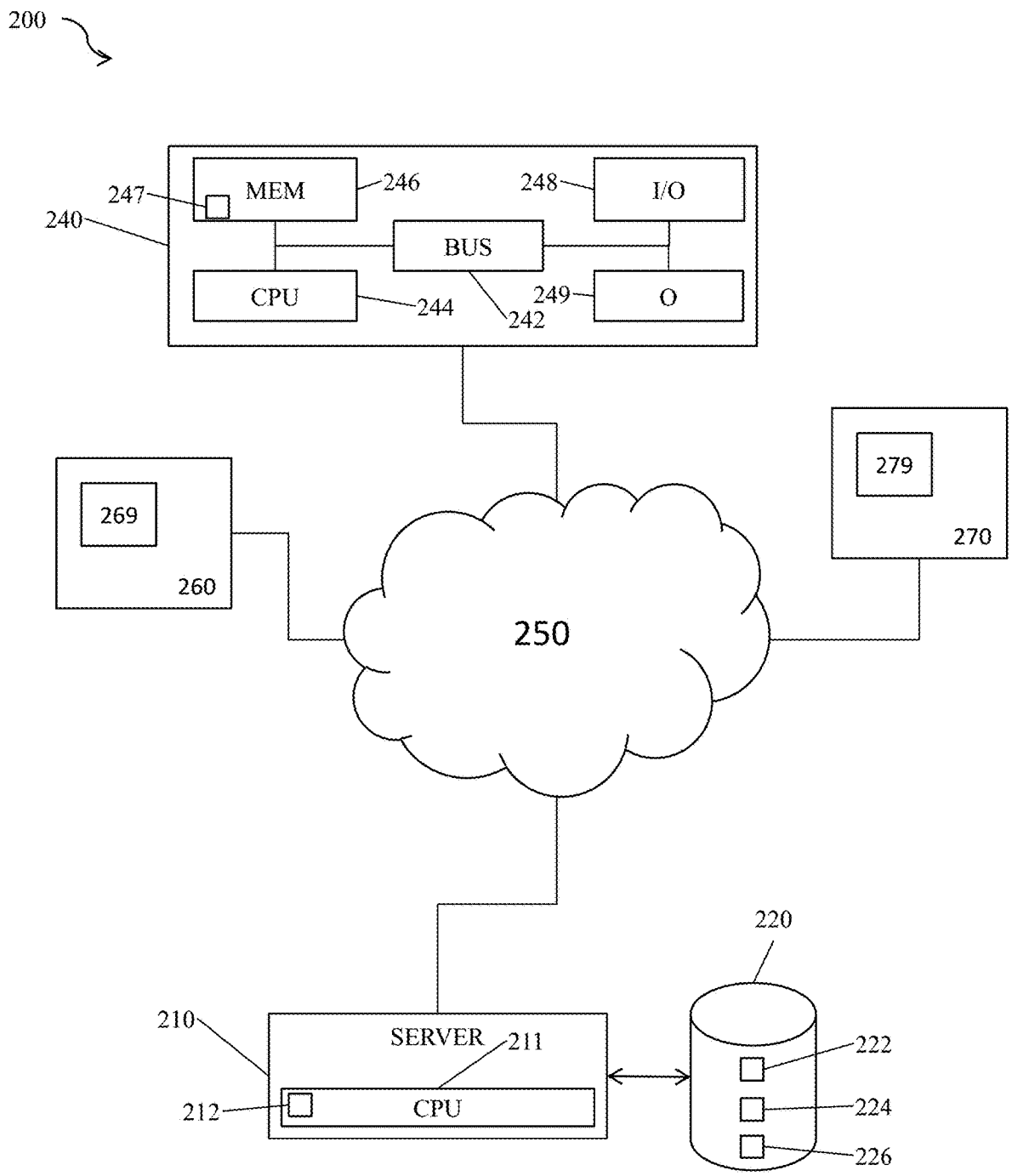
FIG. 6 is a schematic diagram of a cloud-based system of the present invention.

Referring now to FIG. 6, a schematic diagram illustrating a virtualized computing network used in of one embodiment of the invention for automated systems and methods is shown. As illustrated, components of the systems and methods include the following components and sub-components, all constructed and configured for network-based communication, and further including data processing and storage. As illustrated in FIG. 6, a basic schematic of some of the key components of a system according to the present invention are shown. The system 200 comprises a server 210 with a processing unit 211. The server 210 is constructed, configured and coupled to enable communication over a network 250. The server provides for user interconnection with the server over the network using a personal computer (PC) 240 positioned remotely from the server, the personal computer having instructions 247. Furthermore, the system is operable for a multiplicity of remote personal computers or terminals 260, 270, having operating systems 269, 279. For example, a client/server architecture is shown. Alternatively, a user may interconnect through the network 250 using a user device such as a personal digital assistant (PDA), mobile communication device, such as by way of example and not limitation, a mobile phone, a cell phone, smart phone, laptop computer, netbook, a terminal, or any other computing device suitable for network connection. Also, alternative architectures may be used instead of the client/server architecture. For example, a PC network, or other suitable architecture may be used. In one embodiment, user devices 240, 260, and 270 are operable to communicate with the intelligence analytics platform and display graphical presentations of processed data from the intelligent analytics platform for a sporting event based on a production sequencing. The network 250 may be the Internet, an intranet, or any other network suitable for searching, obtaining, and/or using information and/or communications. The system of the present invention further includes an operating system 212 installed and running on the server 210, enabling server 210 to communicate through network 250 with the remote, distributed user devices. The operating system may be any operating system known in the art that is suitable for network communication as described hereinbelow. Data storage 220 may house an operating system 222, memory 224, and programs 226.

Figure 7:
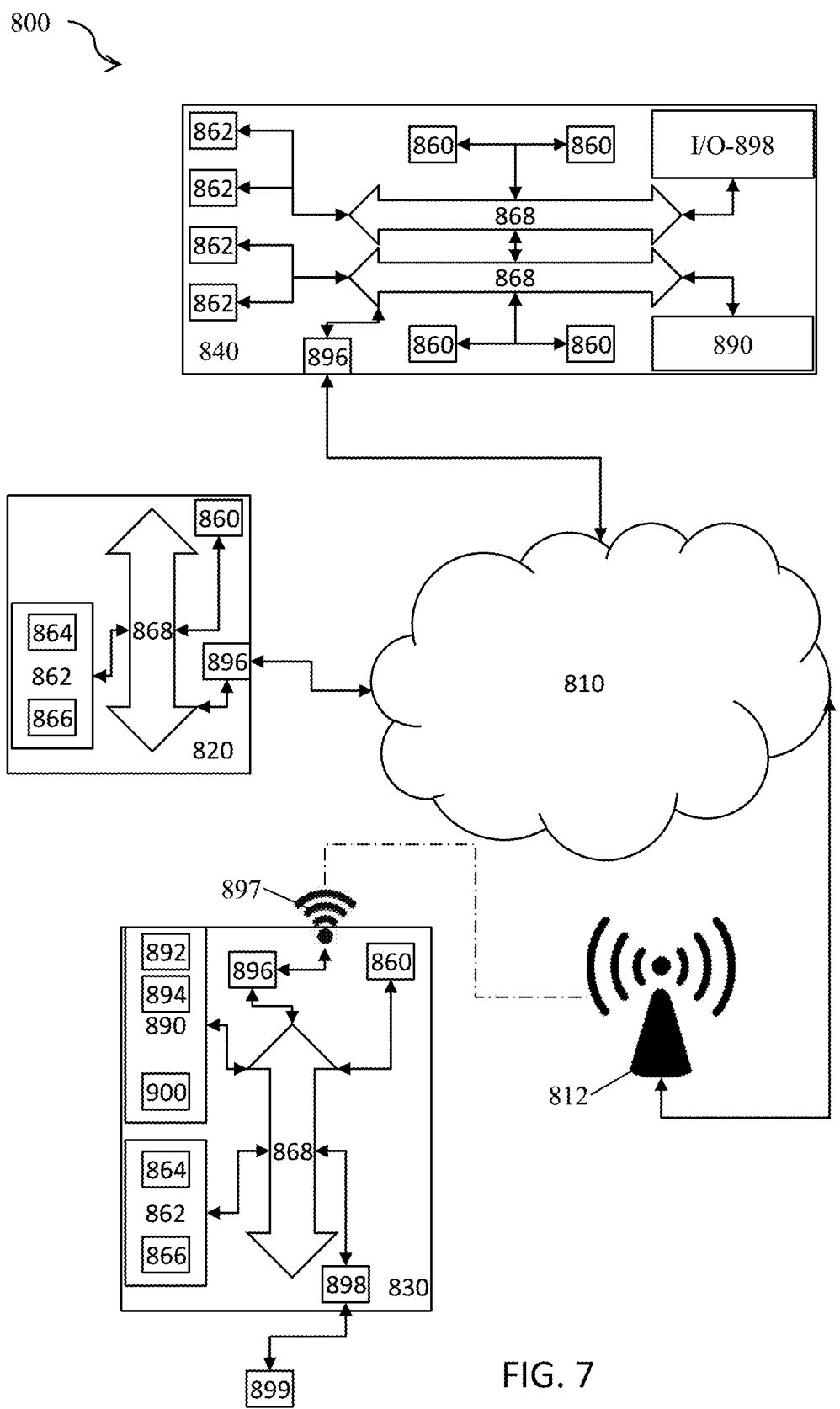
FIG. 7 is another schematic diagram of a cloud-based system of the present invention.

Additionally or alternatively to FIG. 6, FIG. 7 is a schematic diagram of an embodiment of the invention illustrating a computer system, generally described as 800, having a network 810 and a plurality of computing devices

820, 830, 840. In one embodiment of the invention, the computer system 800 includes a cloud-based network 810 for distributed communication via the network's wireless communication antenna 812 and processing by a plurality of mobile communication computing devices 830. In another embodiment of the invention, the computer system 800 is a virtualized computing system capable of executing any or all aspects of software and/or application components presented herein on the computing devices 820, 830, 840. In certain aspects, the computer system 800 may be implemented using hardware or a combination of software and hardware, either in a dedicated computing device, or integrated into another entity, or distributed across multiple entities or computing devices.

By way of example, and not limitation, the computing devices 820, 830, 840 are intended to represent various forms of digital computers 820, 840, 850 and mobile devices 830, such as a server, blade server, mainframe, mobile phone, a personal digital assistant (PDA), a smart phone, a desktop computer, a netbook computer, a tablet computer, a workstation, a laptop, and other similar computing devices. The components shown here, their connections and relationships, and their functions, are meant to be exemplary only, and are not meant to limit implementations of the invention described and/or claimed in this document. In one embodiment, computing devices 820, 830, 840 represent various devices used for displaying and interacting with broadcasting or streaming various sports events.

In one embodiment, the computing device 820 includes components such as a processor 860, a system memory 862 having a random access memory (RAM) 864 and a read-only memory (ROM) 866, and a system bus 868 that couples the memory 862 to the processor 860. In another embodiment, the computing device 830 may additionally include components such as a storage device 890 for storing the operating system 892 and one or more application programs 894, a network interface unit 896, and/or an input/output controller 898. Each of the components may be coupled to each other through at least one bus 868. The input/output controller 898 may receive and process input from, or provide output to, a number of other devices 899, including, but not limited to, alphanumeric input devices, mice, electronic styluses, display units, touch screens, signal generation devices (e.g., speakers) or printers.

By way of example, and not limitation, the processor 860 may be a general-purpose microprocessor (e.g., a central processing unit (CPU)), a graphics processing unit (GPU), a microcontroller, a Digital Signal Processor (DSP), an Application Specific Integrated Circuit (ASIC), a Field Programmable Gate Array (FPGA), a Programmable Logic Device (PLD), a controller, a state machine, gated or transistor logic, discrete hardware components, or any other suitable entity or combinations thereof that can perform calculations, process instructions for execution, and/or other manipulations of information.

In another implementation, shown in FIG. 7, a computing device 840 may use multiple processors 860 and/or multiple buses 868, as appropriate, along with multiple memories 862 of multiple types (e.g., a combination of a DSP and a microprocessor, a plurality of microprocessors, one or more microprocessors in conjunction with a DSP core).

Also, multiple computing devices may be connected, with each device providing portions of the necessary operations (e.g., a server bank, a group of blade servers, or a multi-processor system). Alternatively, some steps or methods may be performed by circuitry that is specific to a given function.

According to various embodiments, the computer system 800 may operate in a networked environment using logical connections to local and/or remote computing devices 820, 830, 840, 850 through a network 810. A computing device 830 may connect to a network 810 through a network interface unit 896 connected to the bus 868. Computing devices may communicate communication media through wired networks, direct-wired connections or wirelessly such as acoustic, RF or infrared through a wireless communication antenna 897 in communication with the network's wireless communication antenna 812 and the network interface unit 896, which may include digital signal processing circuitry when necessary. The network interface unit 896 may provide for communications under various modes or protocols.

In one or more exemplary aspects, the instructions may be implemented in hardware, software, firmware, or any combinations thereof. A computer readable medium may provide volatile or non-volatile storage for one or more sets of instructions, such as operating systems, data structures, program modules, applications or other data embodying any one or more of the methodologies or functions described herein. The computer readable medium may include the memory 862, the processor 860, and/or the storage media 890 and may be a single medium or multiple media (e.g., a centralized or distributed computer system) that store the one or more sets of instructions 900. Non-transitory computer readable media includes all computer readable media, with the sole exception being a transitory, propagating signal per se. The instructions 900 may further be transmitted or received over the network 810 via the network interface unit 896 as communication media, which may include a modulated data signal such as a carrier wave or other transport mechanism and includes any delivery media. The term "modulated data signal" means a signal that has one or more of its characteristics changed or set in a manner as to encode information in the signal.

Storage devices 890 and memory 862 include, but are not limited to, volatile and non-volatile media such as cache, RAM, ROM, EPROM, EEPROM, FLASH memory or other solid state memory technology, discs (e.g., digital versatile disc (DVD), HD-DVD, BLU-RAY, compact disc (CD), CD-ROM) or other optical storage, magnetic cassettes, magnetic tape, magnetic disk storage, floppy disk, or other magnetic storage devices, or any other medium that can be used to store the computer readable instructions and which can be accessed by the computer system 800.

It is also contemplated that the computer system 800 may not include all of the components shown in FIG. 7, may include other components that are not explicitly shown in FIG. 7, or may utilize an architecture completely different than that shown in FIG. 7. The various illustrative logical blocks, modules, elements, circuits, and algorithms described in connection with the embodiments disclosed herein may be implemented as electronic hardware, computer software, or combinations of both. To clearly illustrate this interchangeability of hardware and software, various illustrative components, blocks, modules, circuits, and steps have been described above generally in terms of their functionality. Whether such functionality is implemented as hardware or software depends upon the particular application and design constraints imposed on the overall system. Skilled artisans may implement the described functionality in varying ways for each particular application (e.g., arranged in a different order or partitioned in a different way), but such implementation decisions should not be interpreted as causing a departure from the scope of the present invention.

The present invention, as a whole, is implemented through an unconventional and non-generic combination of physical elements providing sports data collection, advanced analytics and application in a time-sensitive and device-agnostic manner with real time network communication. The analytics platform of the present invention provides improvement to sports data collection and aggregation and digestion, and provides an improvement to the data broadcast and presentation for sporting events, which is inextricably tied to computer technology.

Certain modifications and improvements will occur to those skilled in the art upon a reading of the foregoing description. While a football event is described in detail in this specification, the present invention applies to any other sporting event, by way of example and not limitation, golf, football, basketball, rugby, baseball, soccer, hockey, cricket, volleyball, tennis, lacrosse, horse racing, boxing, mixed martial arts, a race (for instance, a motor vehicle race, a bicycle race, a ski race, a speed skating race), a track and field competition, a fishing tournament, and any other sporting event or competitive event. The above-mentioned examples are provided to serve the purpose of clarifying the aspects of the invention and it will be apparent to one skilled in the art that they do not serve to limit the scope of the invention. All modifications and improvements have been deleted herein for the sake of conciseness and readability but are properly within the scope of the present invention.

The invention claimed is:

1. A system for graphical data presentation for a sporting event, comprising:
    a server platform constructed and configured for network communication with at least one input device and at least one display device;
    wherein the server platform is operable to receive input data from the at least one input device;
    wherein the server platform is operable to process the input data based on a framework of the sporting event, thereby creating processed data;
    wherein the server platform is configured to customize a graphical user interface (GUI) and the graphical data presentation for the at least one display device based on a specific party related to the sporting event, wherein the specific party includes owners, coaches, trainers, medical staff, in-stadium displays, announcers, fans, and/or viewers;
    wherein the server platform is operable to customize and integrate a presentation of the processed data with a presentation of the sporting event; and
    wherein the at least one display device is operable to display the presentation of the processed data with the presentation of the sporting event.

2. The system of claim 1, wherein the framework of the sporting event is based on a context of the sporting event.

3. The method of claim 1, wherein the framework of the sporting event is further based on the production sequencing.

4. The system of claim 1, wherein framework of the sporting event is based on a type of the at least one display device, wherein the system provides a customized presentation of the sporting event based on the type of the at least one display device.

5. The system of claim 1, wherein the at least one display device is further operable to display and interact with the presentation of the processed data.

6. The system of claim 1, wherein the processed data is operable for integration with a character generator and/or a virtual presentation, and wherein the integration with the character generator and/or the virtual presentation is performed in real-time or near real-time.

7. The system of claim 1, wherein the at least one input device is embedded in or adhesively attached to skin of at least one sports player in the sporting event.

8. The system of claim 1, wherein the production sequencing is not fixed and is based on a rhythm, an event sequencing, and/or a natural cadence of the sporting event.

9. The system of claim 1, wherein the presentation of the processed data is an in-game hybrid statistics line embedded in the presentation of the sporting event.

10. The system of claim 9, wherein the in-game hybrid stat line comprises a section for next generation statistical data.

11. The system of claim 1, wherein the server platform includes one or more cloud servers.

12. A system for graphical data presentation for a sporting event, comprising:
    a server platform constructed and configured for network communication with a multiplicity of input devices and at least one display device;
    wherein the server platform is operable to receive data from the multiplicity of input devices;
    wherein the server platform is operable to analyze the input data based on a framework of the sporting event, thereby creating analyzed data;
    wherein the at least one display device is operable to display the presentation of the analyzed data with a presentation of the sporting event on the at least one display device; and
    wherein the server platform customizes the presentation of the sporting event based on the type of the at least one display device.

13. The system of claim 12, wherein the presentation of the analyzed data is an in-game hybrid statistics line embedded in the presentation of the sporting event.

14. The system of claim 13, wherein the in-game hybrid stat line comprises a section for next generation statistical data.

15. A method for graphical data presentation for a sporting event, comprising:
    providing a server platform constructed and configured for communication with at least one input device and at least one display device;
    the server platform receiving input data from the at least one input device;
    the server platform processing the input data based on a framework of the sporting event, thereby creating processed data;
    the server platform customizing and integrating a presentation of the processed data with a presentation of the sporting event;
    the server platform customizing a graphical user interface (GUI) and the graphical data presentation for the at least one display device based on a specific party related to the sporting event, wherein the specific party includes owners, coaches, trainers, medical staff, in-stadium displays, announcers, fans, and/or viewers; and
    the at least one display device displaying the presentation of the processed data with the presentation of the sporting event.

16. The method of claim 15, wherein the server platform includes one or more cloud servers.

17. The method of claim 15, wherein the presentation of the analyzed data is an in-game hybrid statistics line embedded in the presentation of the sporting event.

18. The method of claim 17, wherein the in-game hybrid stat line comprises a section for next generation statistical data.

19. The method of claim 15, wherein the server platform includes at least one machine learning engine and wherein the machine learning engine processes the input data to generate the processed data.

20. The method of claim 15, wherein the framework of the sporting event is further based on the production sequencing and/or a context of the sporting event.

\* \* \* \* \*